UNITED STATES PATENT OFFICE.

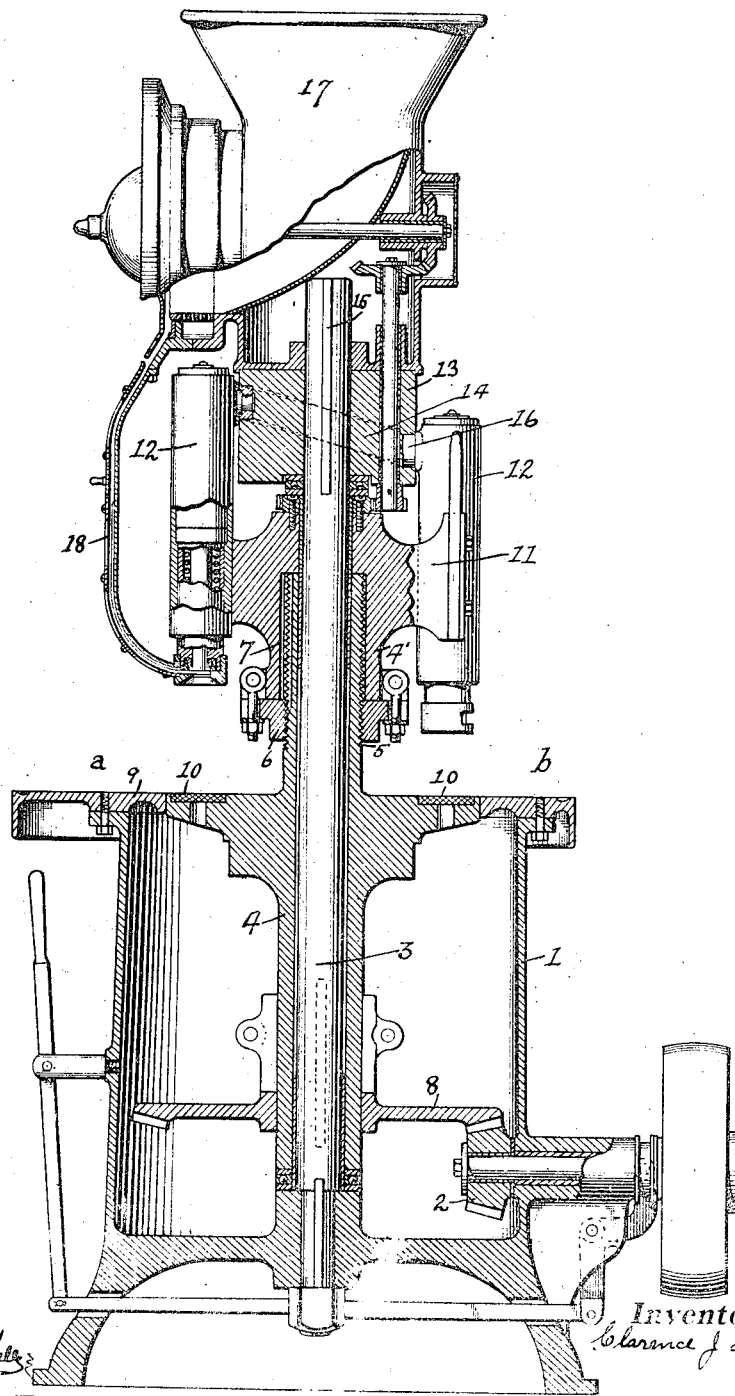

CLARENCE J. LAWSON, OF YONKERS, NEW YORK, ASSIGNOR TO COLUMBIA MACHINE & STOPPER CORPORATION, OF NEW YORK, N. Y., A CORPORATION OF NEW YORK.

BOTTLE-SEALING MACHINE.

1,141,350.  Specification of Letters Patent.  Patented June 1, 1915.

Application filed January 6, 1914. Serial No. 810,573.

*To all whom it may concern:*

Be it known that I, CLARENCE J. LAWSON, a citizen of the United States, residing at Yonkers, in the county of Westchester and State of New York, have invented certain new and useful Improvements in Bottle-Sealing Machines, of which the following is a specification.

My invention relates to improvements in machines for applying closures to bottles and my objects are the production of a continuously operating machine of simple and solid construction in which the parts will be easily accessible for adjustment and repair and on which a maximum output will be possible with a minimum of labor.

The drawing is a vertical sectional view of the machine.

The machine comprises a base 1 having a driving gear 2 near the bottom. A shaft 3 is keyed to the base and extends vertically upward forming a center around which the various parts revolve. Around this shaft 3 is located a sleeve 4, 4', threaded at 5 so that the upper part may be raised and lowered to set the machine for bottles of different heights. The lower sleeve carries a driven gear 8 in mesh with the driving gear 2 to rotate the sleeve about the shaft. Above the driven gear 8 and secured to the sleeve 4 is the bottle support 9 provided with a plurality of bottle pads 10 on which the bottles rests.

The upper part of the sleeve 4' rests on the nut 6 which engages the thread 5 and is slidable vertically on the lower sleeve 4 by turning the nut 6 in adjusting for height. A key and keyway 7 prevents rotation of the upper part of the sleeve on the lower part and keeps the sealing heads centered over the bottle pads. This upper sleeve 4' has a plurality of arms 11, equal in number to the bottle pads 10, provided with guides in which sealing heads 12 reciprocate.

The stationary shaft 3 has a cam ring 13 with a spiral cam groove 14 cut in its face and is fixed to the shaft by a key and keyway 15 so that the cam ring cannot rotate but can slide up and down on the shaft as the upper part of the sleeve is raised and lowered. The sealing heads, which may be of any desired type, engage the groove of the cam through rollers and studs 16.

A hopper 17 on the upper part of the machine receives a mass of closures and supplies them to a chute 18 which extends to the throats of the sealing heads as they pass by in their rotation to deliver caps thereto.

The machine having been adjusted to the height of the bottles to be sealed and having a mass of caps in the hopper is started. The gears 2 and 8 in the base rotate the sleeve 4, 4' thereby rotating the bottle support 9 and sealing heads 12 and as each head passes the chute 18 it receives a closure. During the rotation the heads 12 rise and fall due to their engagement with the groove 14 in the stationary cam ring 13 which positively reciprocates them. Unsealed bottles are now fed to the machine, being placed on the bottle pads at the front *a* (the high side of the cam and raised position of the sealing heads). As the bottle supports and heads rotate the heads are gradually pushed down by the cam groove until at the rear of the machine *b* (or low side of the cam groove and bottom position of the heads) the closure is affixed to the mouth of the bottle hermetically sealing it. Continued rotation raises the head ready to repeat the cycle of operations.

By reciprocating the sealing heads instead of the bottles and continuously rotating the bottle support in a plane all agitation of the liquids and rocking of the bottles is prevented.

As all the principal working parts are of simple and sturdy construction and are located on the outside of the machine they are easily accessible for adjustment and repair.

I claim:—

1. In a bottle sealing machine the combination of a plurality of bottle supports and an equal number of sealing heads slidably mounted thereover in alinement therewith, the supports and heads rotating together, a stationary cam ring the cam portion of which engages the heads for positively raising and lowering them, and means for supplying the sealing heads with closures during rotation.

2. In a bottle sealing machine, the combination of a base, a fixed vertical shaft therethrough, a sleeve surrounding the shaft, driving means engaging the sleeve to rotate it, a plurality of bottle supports on the sleeve, an equal number of sealing heads slidably mounted on the sleeve above the bottle supports, the supports and heads rotating together in alinement, a cam ring secured to the shaft, the cam portion of which engages the sealing heads for positively raising and lowering them.

3. In a bottle sealing machine the combination of a base, a fixed vertical shaft therethrough, a sleeve surrounding the shaft, the upper part of which is adjustable with respect to the lower part, a plurality of bottle supports on the lower part of the sleeve, an equal number of sealing heads slidably mounted on the upper part of the sleeve in alinement with the bottle supports, a cam ring secured to the shaft the cam portion of which engages the sealing heads for positively raising and lowering them, and means for rotating the sleeve and attached parts.

4. In a bottle sealing machine, the combination of a base, a vertical shaft therethrough and fixed to the base, a sleeve surrounding the shaft, the upper part being adjustable with respect to the lower part, a plurality of bottle supports on the lower part of the sleeve, an equal number of sealing heads slidingly mounted on the upper part of the sleeve in alinement with the bottle supports, a cam ring vertically slidable, but non-rotatable, on the shaft the cam portion of which engages the sealing heads for positively raising and lowering them, means for supplying the heads with caps and means for rotating the sleeve and attached parts.

In testimony whereof I have affixed my signature in presence of two witnesses.

CLARENCE J. LAWSON.

Witnesses:
ROBT. B. KILLGORE,
D. MINTZ.